(12) United States Patent
Tanijiri et al.

(10) Patent No.: US 6,266,194 B1
(45) Date of Patent: Jul. 24, 2001

(54) PICTURE DISPLAY APPARATUS AND CAMERA

(75) Inventors: Yasushi Tanijiri, Osakasayama; Akira Sato, Shiga-Ken, both of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/153,847

(22) Filed: Sep. 16, 1998

(30) Foreign Application Priority Data

Sep. 18, 1997 (JP) .................................................. 9-253111
Jul. 27, 1998 (JP) ................................................ 10-210643

(51) Int. Cl.⁷ .................................................. G02B 27/14
(52) U.S. Cl. .................................... 359/631; 359/630
(58) Field of Search ................................. 359/630, 631, 359/633, 637; 345/7, 8, 9

(56) References Cited

U.S. PATENT DOCUMENTS

| | | | |
|---|---|---|---|
| 4,232,968 | * 11/1980 | Kempf | 356/393 |
| 5,659,430 | 8/1997 | Togino | 359/731 |
| 5,801,885 | * 9/1998 | Togino | 359/630 |

FOREIGN PATENT DOCUMENTS 7-175009   7/1995   (JP) .

* cited by examiner

*Primary Examiner*—Ricky Mack
(74) *Attorney, Agent, or Firm*—Burns, Doane, Swecker & Mathis, LLP (57) ABSTRACT

A picture display apparatus is provided in which not only reduction in weight and protruding amount is achieved but also aberration is small and wide-angle display can be inexpensively performed by providing a semitransparent reflecting surface.

A picture display apparatus of the present invention includes cholesteric liquid crystal for displaying a plane image, a fiber plate for converting a displayed plane image into a spherical image, and an eyepiece optical system having first and second spherical semitransparent reflecting surfaces and projecting a spherical image. A spherical image with its center of curvature in the vicinity of the pupil is reflected at the second and the first spherical semitransparent reflecting surfaces and is then directed to the viewer's pupil.

31 Claims, 7 Drawing Sheets

PICTURE DISPLAY APPARATUS AND CAMERA

This application is based on applications Nos. H9-253111 and H10-210643 filed in Japan, the contents of which are hereby incorporated by reference.

BACKGROUND OF THE INVENTION

1. Field of the Invention

The present invention relates to a picture display apparatus, and more particularly, to a picture display apparatus designed so as to be mounted on the viewer's head or face. The present invention further relates to a camera requiring no complicated picture conversion processing.

2. Description of the Prior Art

For a head mounted display (HMD), reduction in overall weight and protruding amount of the apparatus is important in order to improve the mountability of the apparatus. A factor that decides the overall weight of the apparatus is the optical system layout. Among the optical systems that have hitherto been disclosed, examples of optical systems that can be reduced in protruding amounts of apparatus are shown in FIGS. 1 and 2.

FIRST CONVENTIONAL EXAMPLE

Figure 1:
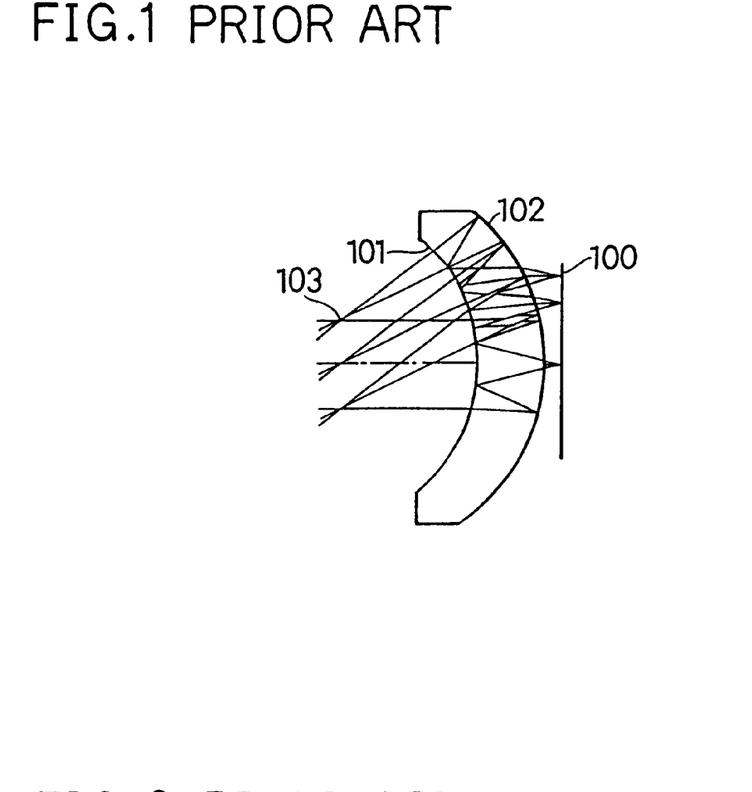
FIG. 1 is a cross-sectional view of the optical system of the first conventional example.
Figure 2:
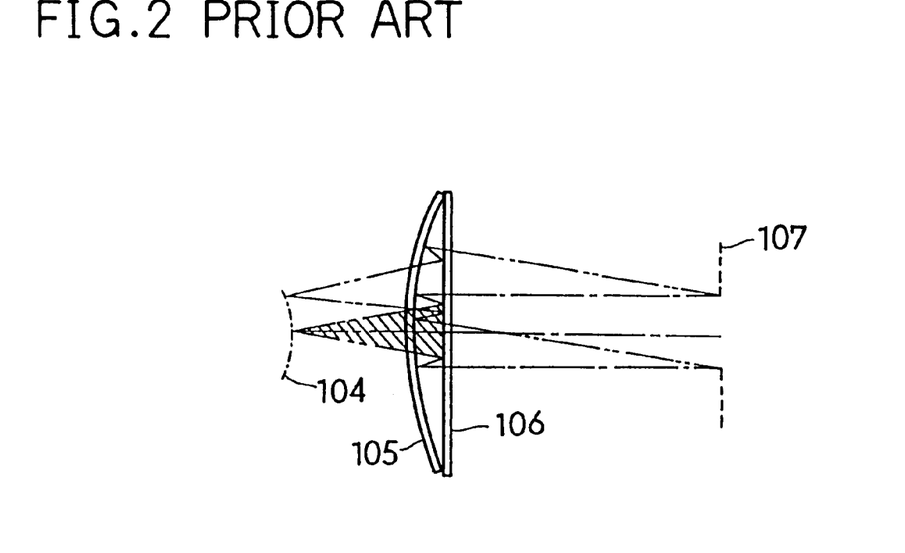
FIG. 2 is a cross-sectional view of the optical system of the second conventional example.

FIG. 1 shows an optical system disclosed in Japanese Laid-open Patent Application No. H7-175009. This optical system projects an image surface 100 far away through a semitransparent reflecting surface 102 and a semitransparent reflecting surface 101. According to this arrangement, the size of the optical system can be reduced by repetitively reflecting the light between the image surface 100 and a viewer's pupil position 103, so that the amount of frontward protrusion of the HMD from the viewer's head can be reduced.

SECOND CONVENTIONAL EXAMPLE

FIG. 2 shows an optical system disclosed in U.S. Reissued Pat. No. 27356. This optical system projects an image surface 104 far away through a semitransparent concave mirror 105 and a semitransparent plane mirror 106. According to this arrangement, like the first conventional example, the size of the optical system can be reduced by repetitively reflecting the light between the image surface 104 and a viewer's pupil position 107.

For an HMD, in addition to reduction in overall weight and protruding amount of the apparatus, provision of a large angle of view is important. Provision of a large angle of view enables display of more realistic pictures. However, in the first conventional example, since plane images are viewed being enlarged, correction of optical aberrations such as field curvature and distortion is limited, so that the angle of view cannot be widened.

In the second conventional example, since the image surface is a curved surface having its center on the side opposite to the pupil position, the angle of view cannot be widened.

In both of the two conventional examples, the pictures projected onto the viewer's pupil are plane images. However, viewers view more realistic pictures by viewing spherical images than by viewing plane images.

Another problem will be described. A picture display apparatus for viewing pictures taken from life has been disclosed and in this apparatus, a necessary range of a picture is cut out from the shooting range and then the cut out picture is viewed. However, in case a picture is viewed with a position different from the shooting center as the viewing center, it is necessary to convert image data since faithful picture reproduction cannot be performed by using the video signals of the shot picture as they are. Therefore, for example, it is necessary to perform image processing and this increases the price of the apparatus.

A conventional camera for shooting plane images also has problems. Even if plane images are continuously shot, it is impossible to obtain a 360-degree picture in which these images connect neatly. In a case where plane images shot by this type of camera are viewed by being displayed on a display apparatus, when a picture is viewed with a position different from the shooting center as the viewing center, the positional relationship among the objects in the picture changes. This will be described with reference to FIGS. 3 to 5.

Figure 3:
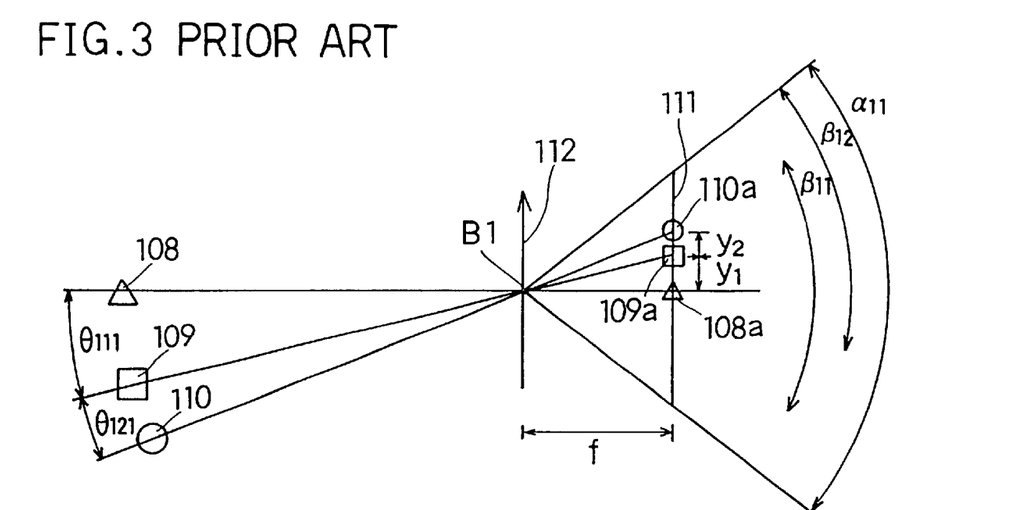
FIG. 3 shows the shooting angle of the conventional camera.

FIG. 3 is a schematic cross-sectional view of an optical system of a camera. Reference numeral 112 represents a taking lens. Point B1 represents the principal point of the taking lens 112. Reference numeral 111 represents an image shot surface comprising a plane. $\alpha_{11}$ represents the shooting range of the camera. When a picture including objects 108, 109 and 110 is shot with the object 108 as the shooting center, the light rays from the objects are imaged on the image shot surface 111 as shown in the figure.

The angle between the straight lines connecting the objects and the principal point B1 is $\theta_{111}$ between the objects 108 and 109 and is $\theta_{121}$ between the objects 109 and 110. The distance between the objects shot on the image shot surface 111 is $y_1$ between objects 108a and 109a and is $Y_2$ between the objects 109a and 110a. The focal length of the taking lens 112 is f. Here, the relationship between $Y_1$, $Y_2$ and $\theta_{111}$, $\theta_{121}$ is represented by these expressions.

$$Y_1 = f \tan\theta_{111} \quad (1)$$

$$Y_2 = f \tan(\theta_{111}+\theta_{121}) - Y_1 \quad (2)$$

Figure 4:
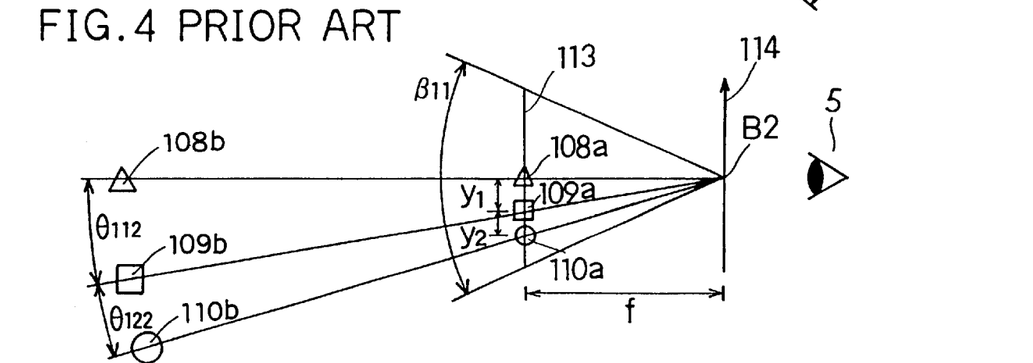
FIG. 4 shows the viewing angle of the conventional picture display apparatus (when no image processing is performed)
Figure 5:
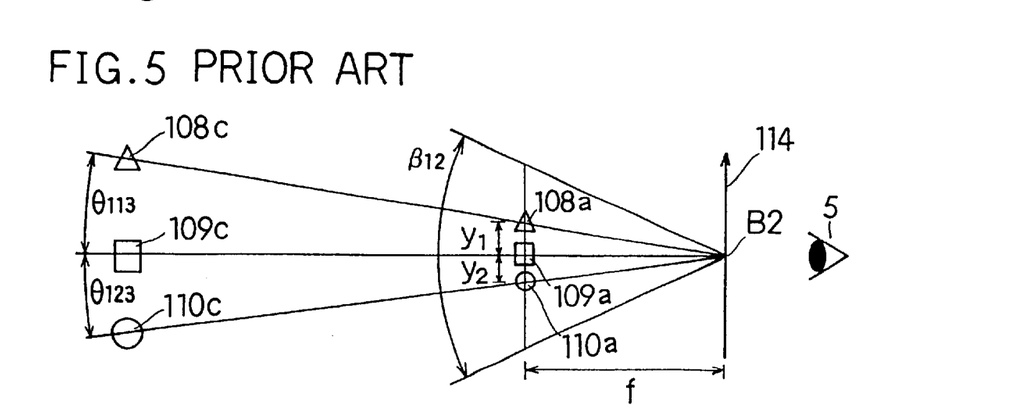
FIG. 5 shows the viewing angle of the conventional picture display apparatus (when no image processing is performed) when the viewing center is different from that of FIG. 4.

Hereinafter, a picture viewed when a part of the shooting range $\alpha_{11}$ is viewed with a picture display apparatus will be described with reference to FIGS. 4 and 5. FIGS. 4 and 5 are schematic cross-sectional views of the picture display apparatus. On a display device 113, the picture on the image shot surface 111 which is horizontally and vertically flipped is displayed as it is. The viewer views the picture through an eyepiece 114. Point B2 represents the principal point of the taking lens. The focal length of the taking lens 114 is f same as that of the camera.

FIGS. 4 and 5 are schematic cross-sectional views of the optical system of the picture display apparatus when a range $\beta_{11}$ is viewed with the object 108a as the viewing center and when a range $\beta_{12}$ is viewed with the object 109a as the viewing center, respectively.

In FIG. 4, the viewer views objects 108b, 109b and 110b. At this time, the angle between the straight lines connecting the viewed objects and the principal point B2 of the taking optical system 114 is $\theta_{112}$ between the objects 108b and 109b and is $\theta_{122}$ between the objects 109b and 110b. The relationship between $\theta_{112}$, $\theta_{122}$ and $y_1$, $Y_2$ is represented by these expressions.

$$\theta_{112} = \tan^{-1}(y_1/f) \quad (3)$$

$$\theta_{122} = \tan^{-1}\{(y_1+y_2)/f\} - \theta_{112} \quad (4)$$

Comparing the expressions (1) and (3) and the expressions (2) and (4), it is apparent that $\theta_{112}=\theta_{111}$ and $\theta_{122}=\theta_{121}$.

In FIG. 5, the viewer views objects 108c, 109c and 110c. At this time, the angle between the straight lines connecting the objects and the principal point B2 of the taking optical system 114 is $\theta_{113}$ between the objects 108c and 109c and is $\theta_{123}$ between the objects 109c and 110c. The relationship between $\theta_{113}$, $\theta_{123}$ and $Y_1$, $Y_2$ is represented by these expressions.

$$\theta_{113} = \tan^{-1}(y_1/f) \quad (5)$$

$$\theta_{123} = \tan^{-1}(y_2/f) \quad (6)$$

Comparing the expressions (1) and (5) and the expressions (2) and (6), it is apparent that $\theta_{113} = \theta_{111}$ and $\theta_{123} \neq \theta_{121}$. Thus, when a picture is viewed with a position different from the shooting center as the viewing center (this occurs when the shooting range is larger than the display screen), the picture viewed by the viewer is not faithful reproduction of the shot picture.

In order to display faithful reproduction of shot pictures with conventional display apparatuses, it is necessary to perform complicated image processing when pictures are displayed.

SUMMARY OF THE INVENTION

An object of the present invention is to provide a picture display apparatus being lightweight, small in protruding amount and capable of inexpensively performing wide-angle display.

Another object of the present invention is to provide a picture display apparatus and a camera in which it is unnecessary to perform complicated picture conversion processing even when pictures are viewed with a position different from the shooting center as the viewing center.

To achieve the above-mentioned objects, a picture display apparatus of the present invention comprises: display means for displaying a spherical image; and an eyepiece optical system having first and second spherical semitransparent reflecting surfaces, the eyepiece optical system projecting the spherical image.

According to this arrangement, since the viewer views a spherical image displayed by the display means being enlarged through the eyepiece optical system, the viewer views a highly realistic picture with few aberrations. The display means comprises, for example, a display portion for displaying a plane image and a converting portion for converting a displayed plane image into a spherical image.

Moreover, a picture display apparatus of the present invention comprises: display means for deflection-scanning light in two directions to display a spherical image; and an eyepiece optical system having first and second surfaces, the eyepiece optical system projecting a spherical image.

According to this arrangement, high-definition pictures can be provided by forming pictures by scanning light from a light source. Moreover, since the viewer views a spherical image displayed by the display means being enlarged through the eyepiece optical system, the viewer views a highly realistic picture with few aberrations.

A camera of the present invention comprises: a taking optical system having first and second spherical semitransparent reflecting surfaces; converting means for converting a spherical image projected by the taking optical system into a plane image; and shooting means for shooting a converted plane image.

According to this arrangement, a spherical image with few aberrations is projected through the taking optical system. The spherical image is converted into a plane image through the converting means and the plane image is shot by the shooting means.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, preferred embodiments of the present invention will be described with reference to the drawings.

<First Embodiment>

Figure 6:
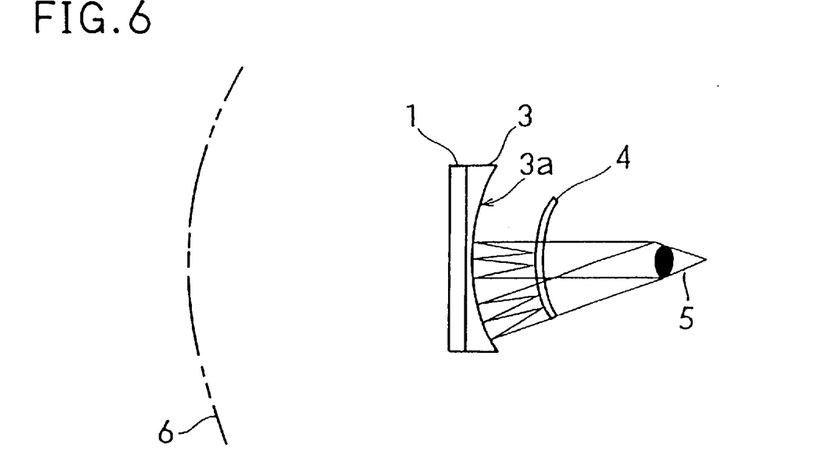
FIG. 6 is a cross-sectional view of an optical system of a picture display apparatus according to a first embodiment.

FIG. 6 is a cross-sectional view of an optical system of a picture display apparatus according to a first embodiment of the present invention. Reference numeral 1 represents cholesteric liquid crystal serving as a display portion. The light exiting from the cholesteric liquid crystal 1 is circularly polarized picture light. Reference numeral 3 represents a fiber plate serving as a spherical image converting portion. The fiber plate 3 has on the side of a viewer's pupil 5 a spherical surface having its center of curvature in the vicinity of the pupil 5. On the spherical surface, a spherical semitransparent reflecting surface (first semitransparent reflecting surface) 3a is formed. The fiber plate 3 converts the pictures displayed by the cholesteric liquid crystal 1 into spherical images.

Reference numeral 4 represents cholesteric liquid crystal comprising a spherical surface (second semitransparent reflecting surface) having its center of curvature in the vicinity of the viewer's pupil 5. The cholesteric liquid crystal 4 selectively transmits and reflects circularly polarized light according to the rotation direction of the circularly polarized light. The first semitransparent reflecting surface 3a and the second semitransparent reflecting surface constitute an eyepiece optical system. Reference numeral 6 represents a virtual image viewed by the pupil 5 through the eyepiece optical system.

The picture light of a plane image exiting from the cholesteric liquid crystal 1 is converted into picture light of a spherical image by the fiber plate 3. The picture light is reflected at the cholesteric liquid crystal 4 without the circular polarization direction changed. Then, the picture light is reflected at the semitransparent reflecting surface 3a of the fiber plate 3. At this time, the circular polarization direction is reversed. The picture light with its circular polarization direction reversed is then transmitted by the cholesteric liquid crystal 4 and supplied to the viewer's pupil 5. The viewer views the virtual image 6.

According to this arrangement, since the centers of curvature of the first semitransparent reflecting surface 3a and the second semitransparent reflecting surface are set in the vicinity of the pupil 5, pictures with only spherical aberration can be provided to the viewer. Here it is preferable that the radius of curvature of the first semitransparent reflecting surface 3a is 1.5 or less times that of the second semitransparent reflecting surface 4. With this arrangement, the diopter within the pupil 5 can be set at a finite distance.

<Second Embodiment>

Figure 7:
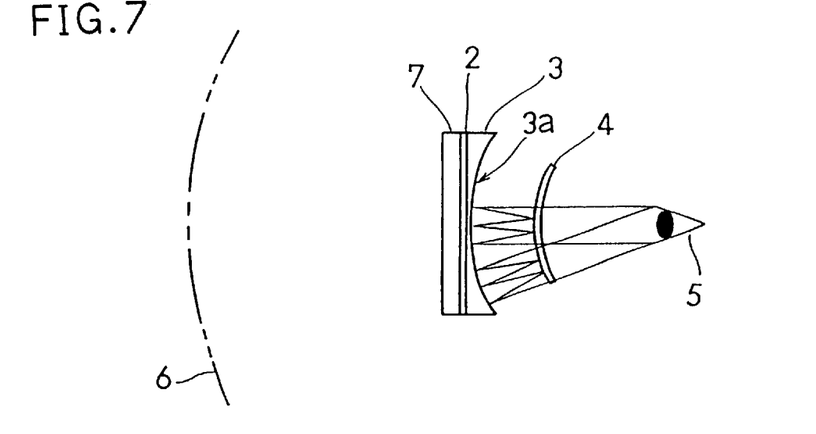
FIG. 7 is a cross-sectional view of an optical system of a picture display apparatus according to a second embodiment.

FIG. 7 is a cross-sectional view of an optical system of a picture display apparatus according to a second embodiment of the present invention. The plane display portion of this embodiment comprises a liquid crystal display (LCD) 7. The structure of the spherical image converting portion and the first and the second semitransparent reflecting surfaces is the same as that of the first embodiment. In the second embodiment, a quarter-wave plate 2 serving as a polarizing portion is formed between the LCD 7 and the fiber plate 3.

The linearly polarized light exiting from the LCD 7 is converted into circular polarized light by the quarter-wave plate 2 and then converted into a spherical image by the fiber plate 3. The fiber plate 3 of this embodiment is structured so that the incident light exits with its polarization condition maintained. That is, linearly polarized spherical image light exits from the fiber plate 3. The order of travel of the light exiting from the fiber plate 3 will not be described because it is the same as that of the first embodiment.

<Third Embodiment>

Figure 8:
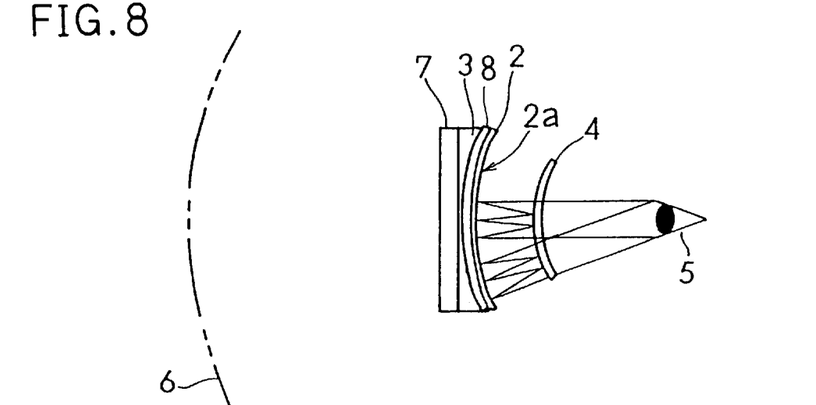
FIG. 8 is a cross-sectional view of an optical system of a picture display apparatus according to a third embodiment.

FIG. 8 is a cross-sectional view of an optical system of a picture display apparatus according to a third embodiment of the present invention. Reference numeral 8 represents a polarizing plate serving as a selectively transmitting portion. The polarizing plate 8 is formed to be spherical on the pupil 5 side spherical surface of a fiber plate 3 and transmits linearly polarized light of a specific direction. A quarter-wave plate 2 serving as a polarizing portion of this picture display apparatus is formed to be spherical on the pupil 5 side spherical surface of the polarizing plate 8. A first semitransparent reflecting surface 2a is formed to be spherical on the pupil 5 side spherical surface of the quarter-wave plate 2. The structure of other portions is the same as that of the second embodiment.

The picture light of a plane image exiting from the LCD 7 is converted into picture light of a spherical image by the fiber plate 3. The fiber plate 3 of this embodiment does not maintain the polarization condition of the incident light. The polarizing plate 8 transmits linearly polarized light of the light exiting from the fiber plate 3. The transmitted light is converted into circularly polarized light by the quarter-wave plate 2. The order of travel of the light exiting from the quarter-wave plate 2 will not be described because it is the same as that of the first embodiment.

<Fourth Embodiment>

Figure 9:
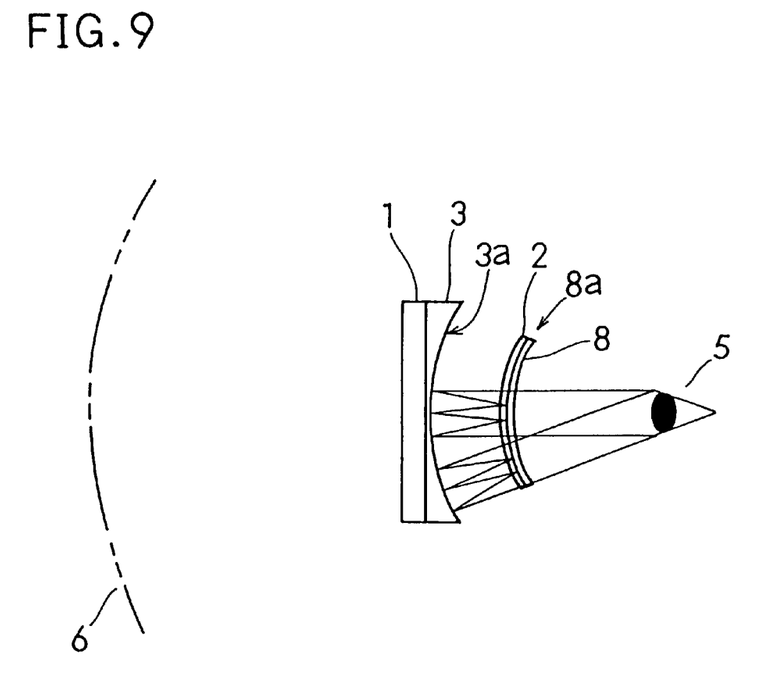
FIG. 9 is a cross-sectional view of an optical system of a picture display apparatus according to a fourth embodiment.

FIG. 9 is a cross-sectional view of an optical system of a picture display apparatus according to a fourth embodiment of the present invention. Reference numeral 1 represents cholesteric liquid crystal serving as a display portion. The light exiting from the cholesteric liquid crystal 1 is circularly polarized picture light. Reference numeral 3 represents a fiber plate having on the side of a viewer's pupil 5 a spherical semitransparent reflecting surface 3a (first semitransparent reflecting surface) with its center of curvature in the vicinity of the pupil 5. The fiber plate 3 converts the plane images displayed by the cholesteric liquid crystal 1 into spherical images.

Reference numeral 2 represents a quarter-wave plate comprising a spherical surface with its center of curvature in the vicinity of the viewer's pupil 5. The quarter-wave plate 2 converts linearly polarized light into circularly polarized light and circularly polarized light into linearly polarized light. Reference numeral 8 represents a polarizing plate serving as a selectively transmitting portion for selectively transmitting and reflecting linearly polarized light different in direction by 90 degrees. That is, the surface of the polarizing plate 8 which is in contact with the quarter-wave plate 2 serves as a second semitransparent reflecting surface 8a. The first semitransparent reflecting surface 3a and the second semitransparent reflecting surface 8a constitute an eyepiece optical system. Reference numeral 6 represents a virtual image viewed by the viewer.

The picture light of a plane image exiting from the cholesteric liquid crystal 1 is converted into picture light of a spherical image by the fiber plate 3, and is then converted from circular polarized light into linearly polarized light by the quarter-wave plate 2. The linearly polarized light is reflected at the second semitransparent reflecting surface 8a. The picture light again converted into circularly polarized light by the quarter-wave plate 2 is reflected at the first semitransparent reflecting surface 3a. At this time, the circular polarization direction is reversed. The picture light with its circular polarization direction reversed is converted into linearly polarized light (linearly polarized light different in direction from the previous linearly polarized light) by the quarter-wave plate 2, and is then transmitted by the polarizing plate 8 to be made incident on the viewer's pupil 5. The viewer views the virtual image 6.

In this picture display apparatus, like in the first embodiment, it is preferable that the radius of curvature of the first semitransparent reflecting surface 3a is 1.5 or less times that of the second semitransparent reflecting surface 8a. With this arrangement, the diopter within the pupil 5 can be set at a finite distance.

While the plane display portion and the fiber plate 3 for converting plane images into spherical images are used in the first to the fourth embodiments, a spherical display portion may be provided without the provision of the converting portion such as the fiber plate. For example, the use of a spherical liquid crystal display (LCD) makes it unnecessary to provide a converting portion such as a fiber plate.

<Fifth Embodiment>

Figure 10:
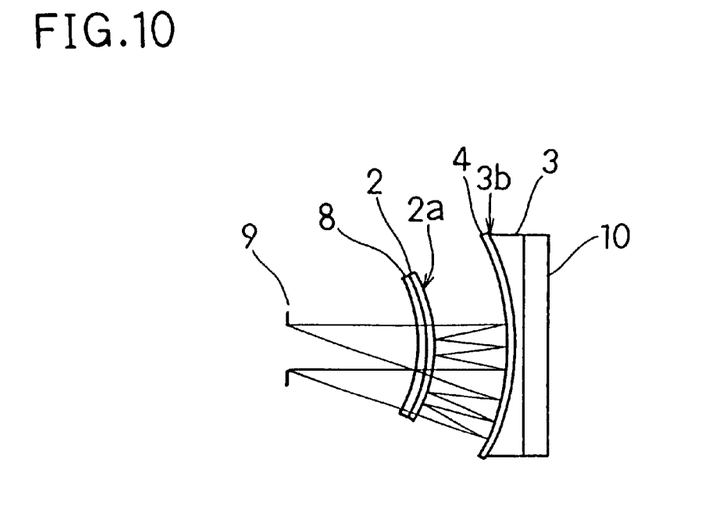
FIG. 10 is a cross-sectional view of an optical system of a camera according to a fifth embodiment.

FIG. 10 is a cross-sectional view of an optical system of a camera according to a fifth embodiment of the present invention. Reference numeral 9 represents an entrance pupil. Reference numeral 8 represents a polarizing plate for selectively transmitting and reflecting linearly polarized light different in direction by 90 degrees. The polarizing plate 8 comprises a spherical surface with its center of curvature in the vicinity of the entrance pupil 9. Reference numeral 2 represents a quarter—wave plate comprising a spherical surface for converting circularly polarized light into linearly polarized light and linearly polarized light into circularly polarized light. On the side surface of the quarter-wave plate 2 on the side opposite to the entrance pupil 9, a first semitransparent reflecting surface 2a is formed.

Reference numeral 4 represents cholesteric liquid crystal (second semitransparent reflecting surface) for selectively reflecting and transmitting circularly polarized light. The cholesteric liquid crystal 4 comprises a spherical surface with its center of curvature in the vicinity of the entrance pupil 9. The first semitransparent reflecting surface 2a and the second semitransparent reflecting surface 4 constitute a taking optical system. Reference numeral 3 represents a fiber plate for converting spherical images into plane images. Reference numeral 10 represents a photoelectric converter (CCD).

Of subject light passing through the entrance pupil 9, only linearly polarized light of a specific direction is transmitted by the polarizing plate 8. The light transmitted by the polarizing plate 8 is converted into circularly polarized light by the quarter-wave plate 2 and is reflected at the cholesteric liquid crystal 4 without the circularly polarization direction changed. Then, the light is reflected at the first semitransparent reflecting surface 2a. Since the polarization direction is reversed at this time, the light is transmitted by the cholesteric liquid crystal 4. The light transmitted by the cholesteric liquid crystal 4 is converted from a spherical image into a plane image by the fiber plate 3 and is supplied to the CCD 10. The CCD 10 shoots the supplied plane image. The entrance pupil 9 side spherical surface 3b of the fiber plate 3 serves as the image formed surface.

The relationship between the shooting angle and the viewing angle when pictures taken by the camera of the fifth embodiment are viewed with the picture display apparatuses of the first to the fourth embodiments will hereinafter be described.

Figure 11:
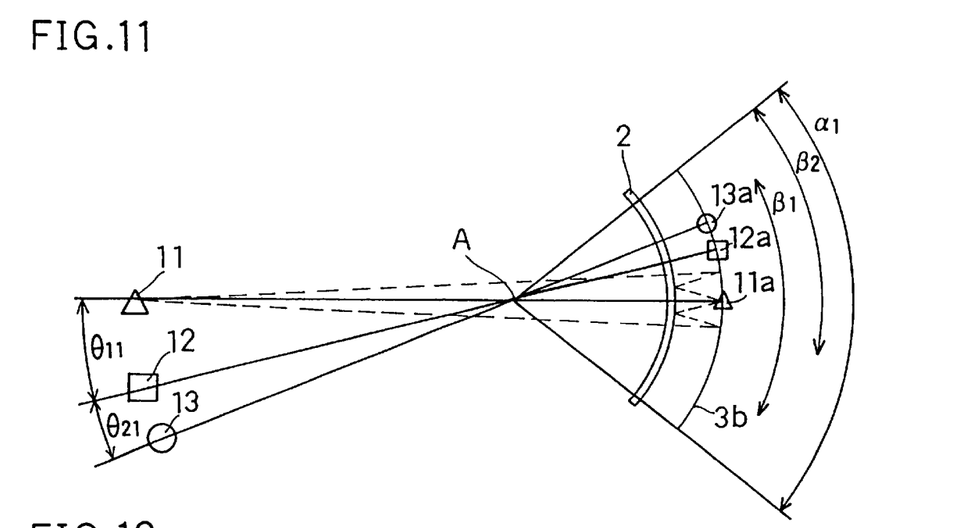
FIG. 11 shows a shooting angle of the camera.

FIG. 11 shows the shooting angle of the camera. The optical system of the camera of the fifth embodiment is simplified so that only the quarter-wave plate 2 and the image formed surface 3b are shown. Point A represents the principal point of the taking optical system. Assume that objects 11, 12 and 13 are simultaneously shot with the object 11 as the shooting center. At this time, the objects are projected onto the image formed surface 3b as objects 11a, 12a and 13a, respectively. $\alpha_1$ represents the shooting range. The angle between the straight lines connecting the objects 11, 12 and 13 and the principal point A is all between the objects 11 and 12 and is $\theta_{21}$ between the objects 12 and 13. The objects are imaged on the image formed surface 3b with this angle relationship maintained.

This camera has storing means (not shown) for storing shot pictures and picture range selecting means (not shown) for selecting which range of a stored picture is outputted based on a signal from the picture display apparatus. The picture range selecting means is enabled when the display range of the picture display apparatus is smaller than the shooting range of the camera or a stored wide-range (for example, 360-degree) picture having been shot previously.

The shooting angle when a picture shot as described above is viewed, for example, with the picture display apparatus of the first embodiment will be described. In the camera of the fifth embodiment, a spherical image on the image formed surface 3b shown in FIG. 6 is converted into a plane image and captured by the CCD 10.

This picture is displayed being horizontally and vertically flipped on the display means 1 of the picture display apparatus of the first embodiment, and then, converted into a spherical image (the same as the spherical image before the image capture by the CCD 10 in the camera except that this spherical image is horizontally and vertically flipped) and picture light is outputted from the semitransparent reflecting surface 3a. The process of conversion into plane images is not shown in FIG. 11 and FIGS. 12 and 13 which are schematic cross-sectional views of the optical system of the picture display apparatus.

Figure 12:
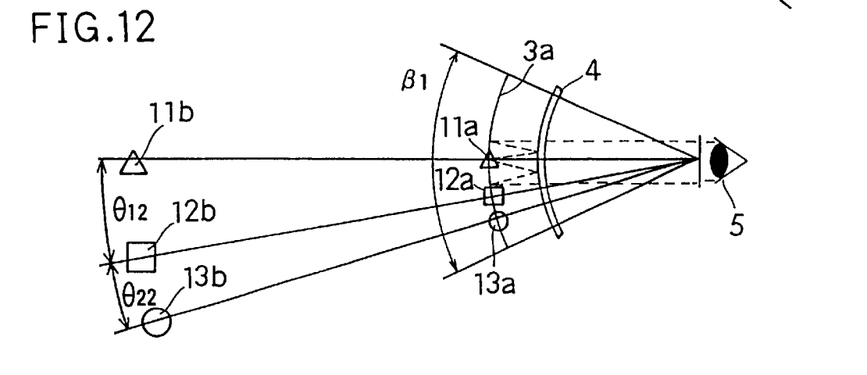
FIG. 12 shows a viewing angle of the picture display apparatus.
Figure 13:
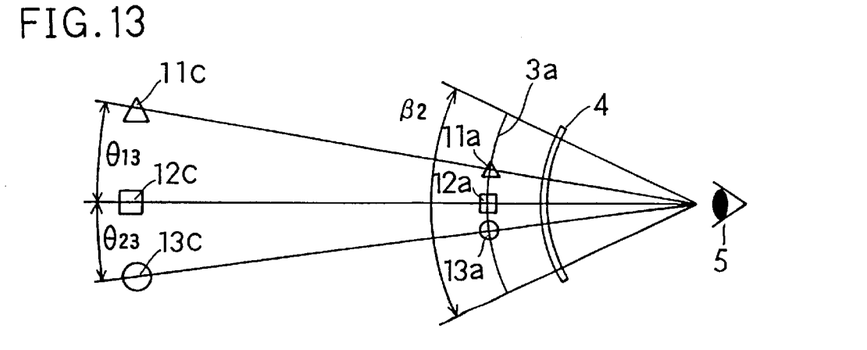
FIG. 13 shows a viewing angle of the picture display apparatus when the viewing center is different from that of FIG. 12.

FIG. 12 shows the viewing angle when a range $\beta_1$ is viewed with the object 11a on the image formed surface 3b of FIG. 11 as the viewing center. FIG. 13 shows the shooting angle when a range $\beta_2$ is viewed with the object 12a on the image formed surface 3b of FIG. 12 as the viewing center.

In FIG. 12, when the viewer views a spherical image through the eyepiece optical system, virtual image objects $11b$, $12_b$ and $13b$ are viewed. The angle between the straight lines connecting the viewed virtual image objects and the pupil 5 is $\theta_{12}$ between the objects $11b$ and $12_b$ and is $\theta_{22}$ between the objects $12_b$ and $13b$. Comparing with FIG. 11, since the angles between the objects on the display surface 3a and on the image formed surface 3b are the same, it is apparent that $\theta_{12}=\theta_{11}$ and $\theta_{22}=\theta_{21}$.

As shown in FIG. 13, when the viewer views a spherical surface with the object 12a as the viewing center, virtual image objects 11c, 12c and 13c are viewed. Deciding the angles between the viewed objects similarly to FIG. 12, the angle is $\theta_{13}$ between the objects 11c and 12c and is $\theta_{23}$ between the objects 12c and 13c. Comparing with FIG. 11, like the case of FIG. 12, since the angles between the objects on the display surface 3a and on the image formed surface 3b are the same, it is apparent that $\theta_{13}=\theta_{11}$ and $\theta_{23}=\theta_{21}$.

While the viewing angle when pictures shot by the camera are viewed with the picture display apparatus of the first embodiment has been described above, the same applies to the viewing angles when pictures are viewed with the picture display apparatuses of the second to the fourth embodiments because the picture display apparatuses of the second to the fourth embodiments have essentially the same structure as that of the first embodiment. Therefore, no detailed description will be given as to the shooting angles when pictures are viewed with these picture display apparatuses.

As shown in FIGS. 12 and 13, when pictures shot by use of the camera of the fifth embodiment are viewed with the picture display apparatuses of the first to the fourth embodiments, the positional relationship among the objects never changes even when the pictures are viewed with a position different from the shooting center of the camera as the viewing center.

While picture display apparatuses whose display portion comprises cholesteric liquid crystal or a liquid crystal display (LCD) have been described as the first to the fourth embodiments, the display portion of the picture display apparatus achieving the present invention is not limited thereto. For example, the display portion may comprise a point light source and scanning means. Picture display apparatuses of the present invention having a display portion comprising a point light source and scanning means will hereinafter be described as sixth and seventh embodiments.

<Sixth Embodiment>

Figure 14:
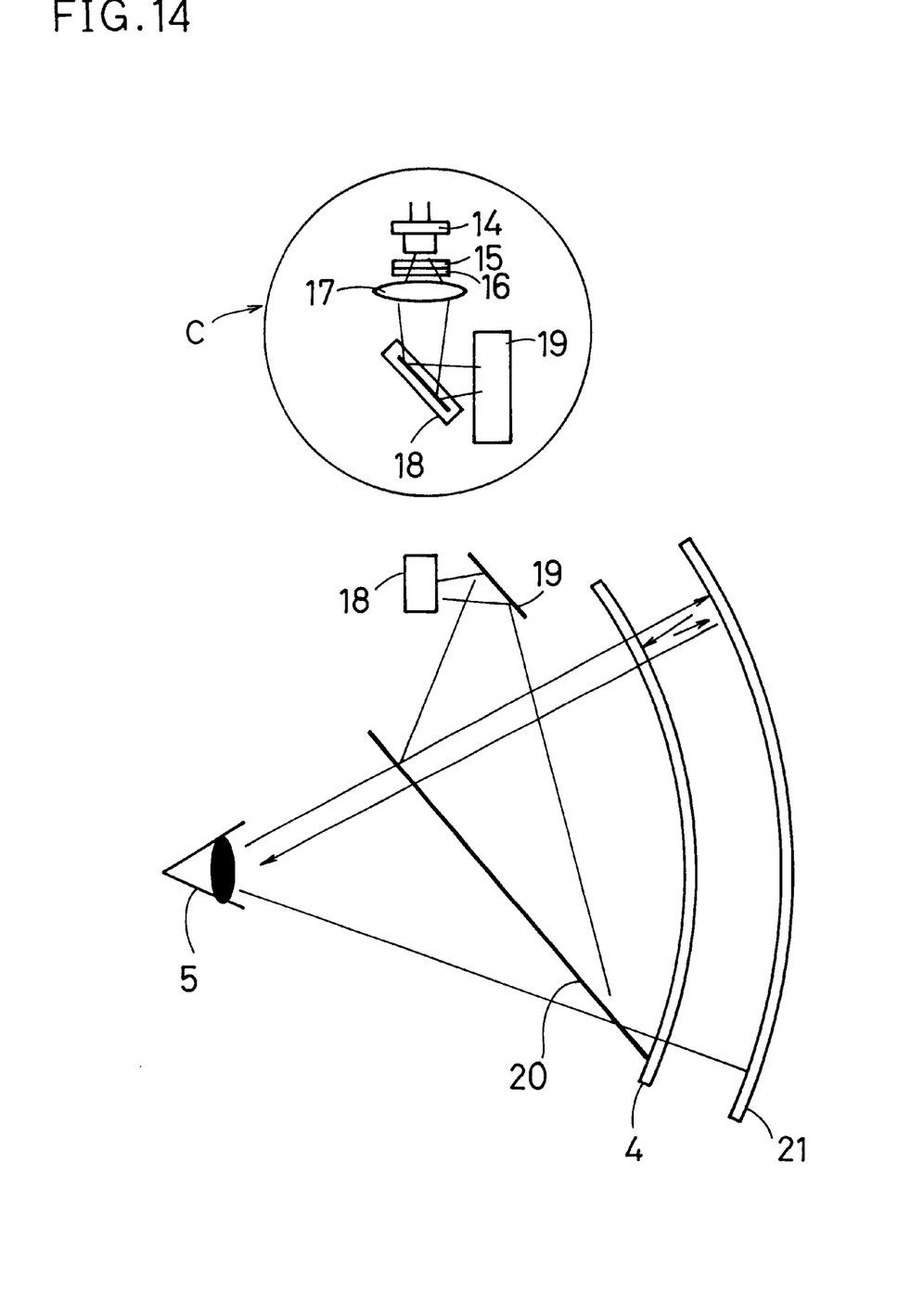
FIG. 14 is a cross-sectional view of an optical system of a picture display apparatus according to a sixth embodiment.

FIG. 14 is a cross-sectional view of an optical system of a picture display apparatus according to the sixth embodiment of the present invention viewed from a side. C shows a part of the picture display apparatus viewed from above. Reference numeral 18 represents a main scanning mirror for scanning incident light in the horizontal direction. As shown in C viewed from above, light emitted by a light source 14 modulated by a video signal is condensed by a condenser lens 17 and made incident on the main scanning mirror 18. Between the light source 14 and the condenser lens 17, a polarizing plate 15 and a quarter-wave plate 16 are disposed. By these elements, light from the light source 14 is polarized into left-handed circularly polarized light and is made incident on the main scanning mirror 18.

Reference numeral 19 represents a sub scanning mirror for scanning light from the main scanning mirror 18 in the vertical direction. Reference numeral 4 is cholesteric liquid crystal comprising a spherical surface (first surface) with its center of curvature in the vicinity of a viewer's pupil 5. The cholesteric liquid crystal 4 selectively transmits and reflects circularly polarized light according to the rotation direction of the circularly polarized light. In this embodiment, cholesteric liquid crystal is used that transmits right-handed circularly polarized light and reflects left-handed circularly polarized light. Reference numeral 21 represents a concave mirror for projecting virtual images onto the viewer's pupil 5. The concave mirror 21 comprises a spherical surface (second surface) with its center of curvature in the vicinity of the viewer's pupil 5. The cholesteric liquid crystal 4 and the concave mirror 21 constitute an eyepiece optical system. Reference numeral 20 is a half mirror for reflecting light from the sub scanning mirror 19 toward the cholesteric liquid crystal 4 and for transmitting light from the direction of the cholesteric liquid crystal 4 and supplying it to the viewer's pupil 5. The main scanning mirror 18 is disposed in a position substantially conjugate with the viewer's pupil 5 with respect to the concave mirror 21.

Picture light of left-handed circularly polarized light scanned by the scanning means comprising the two scanning mirrors 18 and 19 is reflected at the half mirror 20 into right-handed circularly polarized light, is transmitted by the cholesteric liquid crystal 4 and is imaged to be spherical in the vicinity of the concave mirror 21. The spherical image is reflected at the concave mirror 21 into left-handed circularly polarized light, is reflected at the cholesteric liquid crystal 4 (the polarization direction does not change at this time) and is again reflected at the concave mirror 21. At this time, the light is converted into right-handed circularly polarized light, is transmitted by the cholesteric liquid crystal 4 and is further transmitted by the half mirror 20 to be directed to the viewer's pupil 5. By the supplied light, the viewer views a virtual image.

<Seventh Embodiment>

Figure 15:
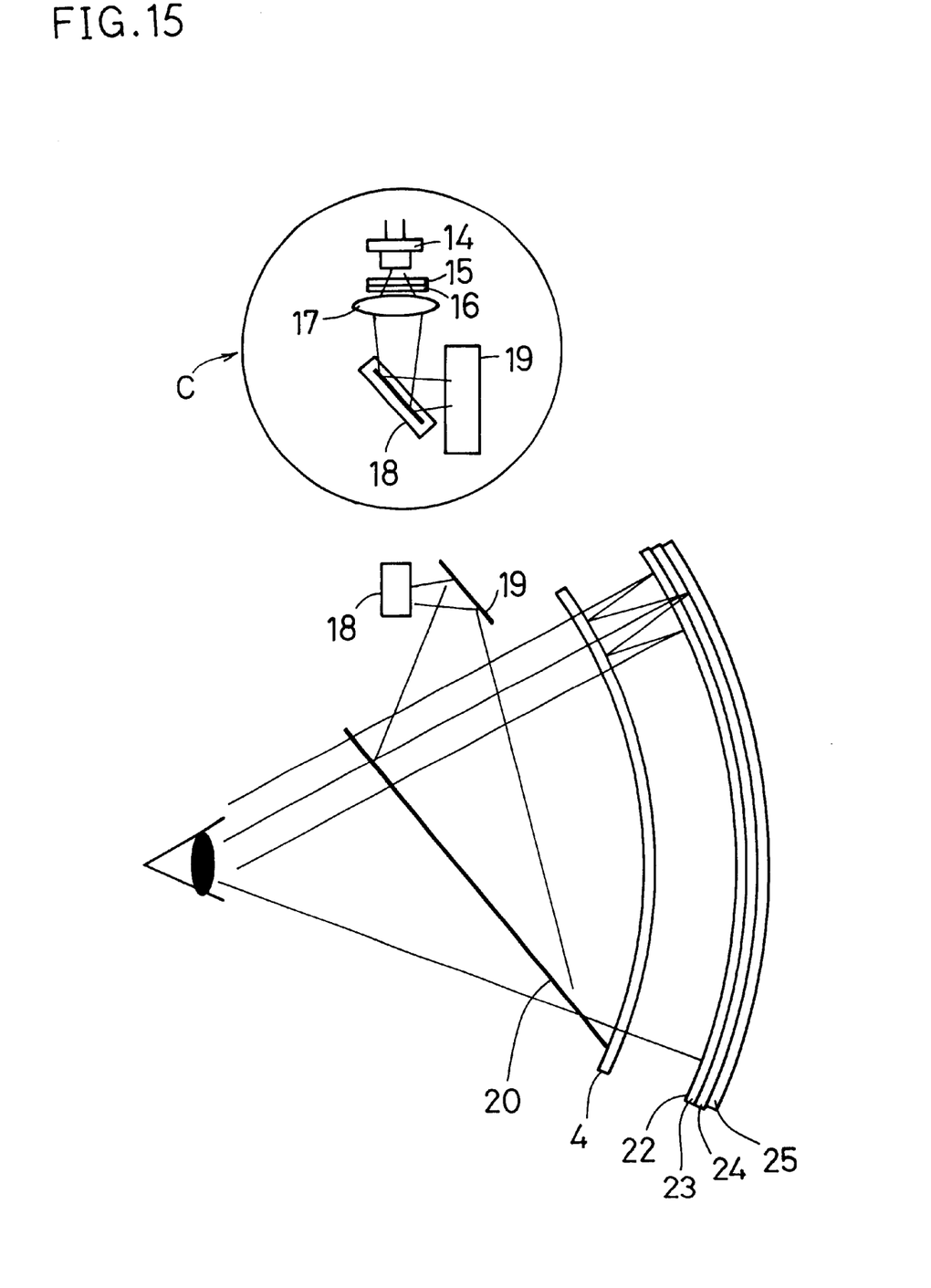
FIG. 15 is a cross-sectional view of an optical system of a picture display apparatus according to a seventh embodiment.

FIG. 15 is a cross-sectional view of an optical system of a picture display apparatus according to the seventh embodiment of the present invention viewed from a side. C shows a part of the picture display apparatus viewed from above. Reference numeral 23 represents a quarter-wave plate. Reference numeral 24 represents a polarizing plate for transmitting only specific linearly polarized light. Reference numeral 25 represents a spherical screen for scattering incident light. These elements each comprise a spherical surface with its center of curvature in the vicinity of the viewer's pupil 5. On the cholesteric liquid crystal 4 side surface of the quarter-wave plate 23, a semitransparent reflecting surface (second surface) 22 is formed. As the polarizing plate 24, one is used that is effective only for light from the direction of the screen 25. The main scanning mirror 18 is disposed in a position substantially optically equivalent to the center of curvature of the screen 25 (that is, in a position substantially conjugate with the viewer's pupil 5). The structure of other portions is the same as that of the sixth embodiment.

Picture light of left-handed circularly polarized light scanned by the scanning means comprising the two scanning mirrors 18 and 19 is reflected at the half mirror 20 into right-handed circular polarized light, is transmitted by the cholesteric liquid crystal 4, the quarter-wave plate 23 including the semitransparent reflecting surface 22 and the polarizing plate 24 and is imaged on the spherical screen 25. The light of the spherical image imaged on the spherical screen 25 is scattered, and only specific linearly polarized light thereof is transmitted by the polarizing plate 24 and is converted into left-handed circular polarized light by the quarter-wave plate 23. Then, the light is reflected at the cholesteric liquid crystal 4 (at this time, the polarization direction does not change) and is then reflected at the semitransparent reflecting surface 22. At this time, the light is converted into right-handed circularly polarized light, is transmitted by the cholesteric liquid crystal 4 and is further transmitted by the half mirror 20 to be directed to the viewer's pupil. By the supplied light, the viewer views a virtual image.

Obviously, many modifications and variations of the present invention are possible in light of the above teachings. It is therefore to be understood that within the scope of the appended claims, the invention may be practiced other than as specifically described.

What is claimed is:

1. A picture display apparatus comprising:

an image display for displaying a spherical image; and an eyepiece optical system having first and second spherical semitransparent reflecting surfaces, said eyepiece optical system projecting the spherical image.

2. A picture display apparatus as claimed in claim 1, wherein said first spherical semitransparent reflecting surface transmits light from said image display and reflects light reflected at said second spherical semitransparent reflecting surface, and wherein said second semitransparent reflecting surface reflects light from said image display and transmits light reflected at said first spherical semitransparent reflecting surface.

3. A picture display apparatus as claimed in claim 1, wherein said eyepiece optical system projects the spherical image to a viewer as a virtual image.

4. A picture display apparatus as claimed in claim 1, wherein a center of curvature of the spherical image is situated in a vicinity of a pupil.

5. A picture display apparatus as claimed in claim 1, wherein centers of curvature of s aid first and second spherical semitransparent reflecting surfaces substantially.

6. A picture display apparatus as claimed in claim 1, wherein said image display comprises a display portion for displaying a plane image and a converting portion for converting the displayed plane image into a spherical image.

7. A picture display apparatus as claimed in claim 6, wherein said display portion comprises a cholesteric liquid crystal.

8. A picture display apparatus as claimed in claim 7, wherein said first spherical semitransparent reflecting surface is provided on said converting portion, and said second spherical semitransparent reflecting surface is provided on another cholesteric liquid crystal having a spherical surface.

9. A picture display apparatus as claimed in claim 7, wherein said first spherical semitransparent reflecting surface is provided on said converting portion, and said second spherical semitransparent reflecting surface is provided on a selectively transmitting portion having a spherical surface and transmitting only light of a specific polarization direction.

10. A picture display apparatus as claimed in claim 1, wherein said image display comprises a display portion for displaying a plane image, a converting portion for converting the displayed plane image into a spherical image and a polarizing portion for converting image light into a circularly polarized image, said polarizing portion being situated between said display portion and said converting portion.

11. A picture display apparatus as claimed in claim 10, wherein said first spherical semitransparent reflecting surface is provided on said converting portion and said second spherical semitransparent reflecting surface is provided on a spherical cholesteric liquid crystal.

12. A picture display apparatus as claimed in claim 1, wherein said image display comprises a display portion for displaying a plane image, a converting portion for converting the displayed plane image into a spherical image, a selectively transmitting portion for transmitting only light of a specific polarization direction and a polarizing portion for converting image light into a circularly polarized image, said converting portion, said selectively transmitting portion and said polarizing portion being disposed in this order from a side closer to said display portion.

13. A picture display apparatus as claimed in claim 12, wherein said first spherical semitransparent reflecting surface is provided on said polarizing portion and said second spherical semitransparent reflecting surface is provided on a spherical cholesteric liquid crystal.

14. A picture display apparatus as claimed in claim 1, wherein said image display comprises a spherical liquid crystal display.

15. A picture display apparatus as claimed in claim 6, wherein said converting portion comprises a fiber plate.

16. A picture display apparatus comprising:
an image display for deflection-scanning light in two directions to display a spherical image; and
an eyepiece optical system having first and second curved surfaces, said eyepiece optical system projecting the spherical image.

17. A picture display apparatus as claimed in claim 16, wherein said first curved surface is provided on a-spherical cholesteric liquid crystal and said second curved surface is provided on a concave mirror.

18. A picture display apparatus as claimed in claim 16, wherein said first curved surface is provided on a spherical cholesteric liquid crystal and said second curved surface is provided on a spherical polarizing portion.

19. A picture display apparatus as claimed in claim 16, further comprising a half mirror for directing a scanned image to said eyepiece optical system.

20. A picture display apparatus as claimed in claim 16, wherein light constituting the spherical image is reflected at said first and second curved surfaces and is then transmitted by said first surface to be supplied to a viewer's pupil.

21. The picture display apparatus of claim 16, wherein the first and second curved surfaces are spherical surfaces.

22. A picture display apparatus comprising:
an image display for displaying a spherical image; and
an eyepiece optical system having first and second curved surfaces, said eyepiece optical system projecting a spherical image.

23. The picture display apparatus of claim 22, wherein the first and second curved surfaces are spherical surfaces.

24. A camera comprising:
a taking optical system having first and second spherical semitransparent reflecting surfaces;
converting means for converting a spherical image projected by said taking optical system into a plane image; and
shooting means for shooting a converted plane image.

25. A camera as claimed in claim 24, wherein said first spherical semitransparent reflecting surface transmits light from an entrance pupil and reflects light reflected at said second spherical semitransparent reflecting surface, and said second spherical semitransparent reflecting surface reflects light from the entrance pupil and transmits light reflected at said first spherical semitransparent reflecting surface.

26. A camera as claimed in claim 24, wherein centers of curvature of said first and second spherical semitransparent reflecting surfaces are situated in a vicinity of an entrance pupil.

27. A camera comprising:
a taking optical system having first and second curved surfaces;
an image converter having an input surface and an output surface wherein a spherical image projected by said taking optical system is converted by the image converter into a converted plane image; and
an image shooter having an entrance surface disposed adjacent to the output surface of the image converter wherein the image shooter shoots the converted plane image.

28. A camera as claimed in claim 27, wherein the first and second curved surfaces are spherical surfaces.

29. A camera as claimed in claim 28, wherein the first and second spherical surfaces are spherical semitransparent reflecting surfaces.

30. A camera as claimed in claim 29, wherein said first spherical semitransparent reflecting surface transmits light from an entrance pupil and reflects light reflected at said second spherical semitransparent reflecting surface, and said second spherical semitransparent reflecting surface reflects light from the entrance pupil and transmits light reflected at said first spherical semitransparent reflecting surface.

31. A camera as claimed in claim 29, wherein centers of curvature of said first and second spherical semitransparent reflecting surfaces are situated in a vicinity of an entrance pupil.

* * * * *